June 7, 1938.　　C. G. STRANDLUND　　2,119,756
PLOW
Filed Jan. 27, 1937　　3 Sheets-Sheet 3
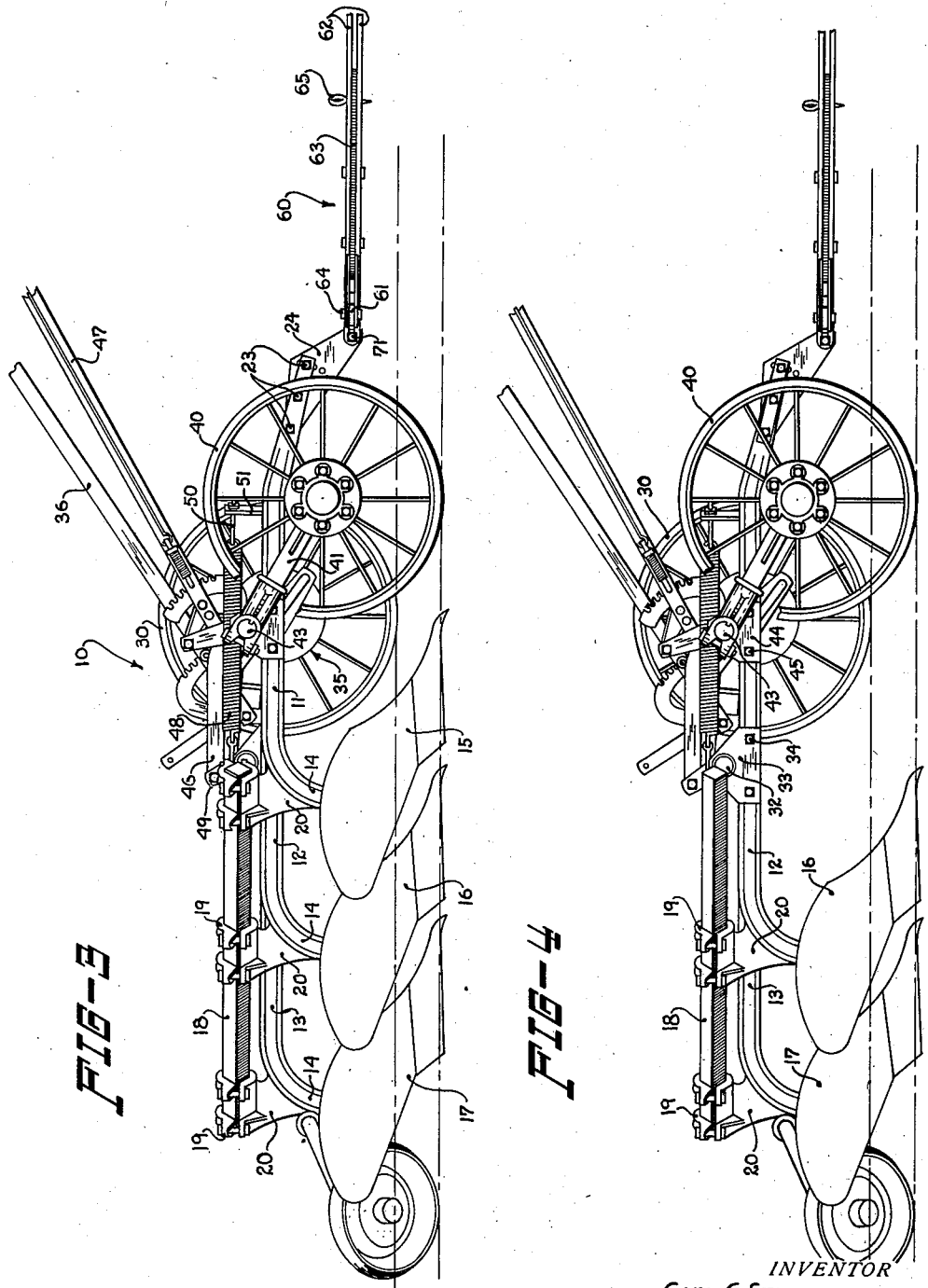
INVENTOR
CARL G. STRANDLUND
BY
ATTORNEYS Patented June 7, 1938

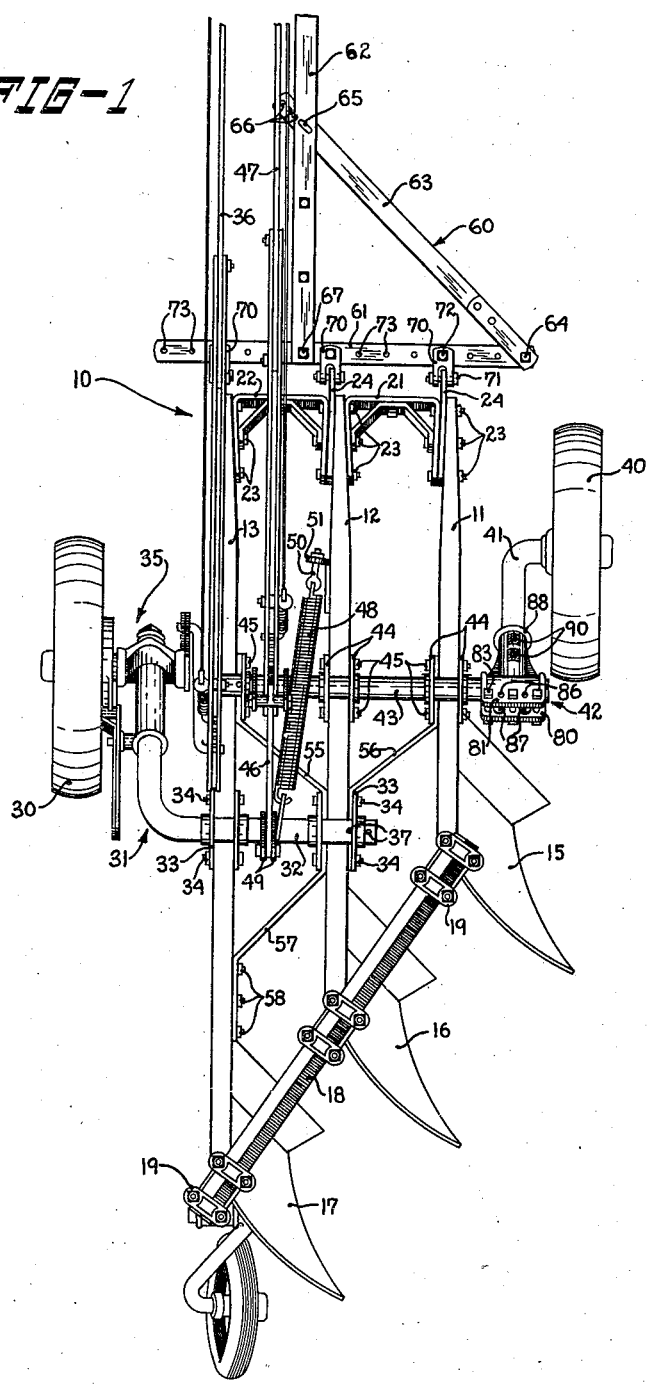

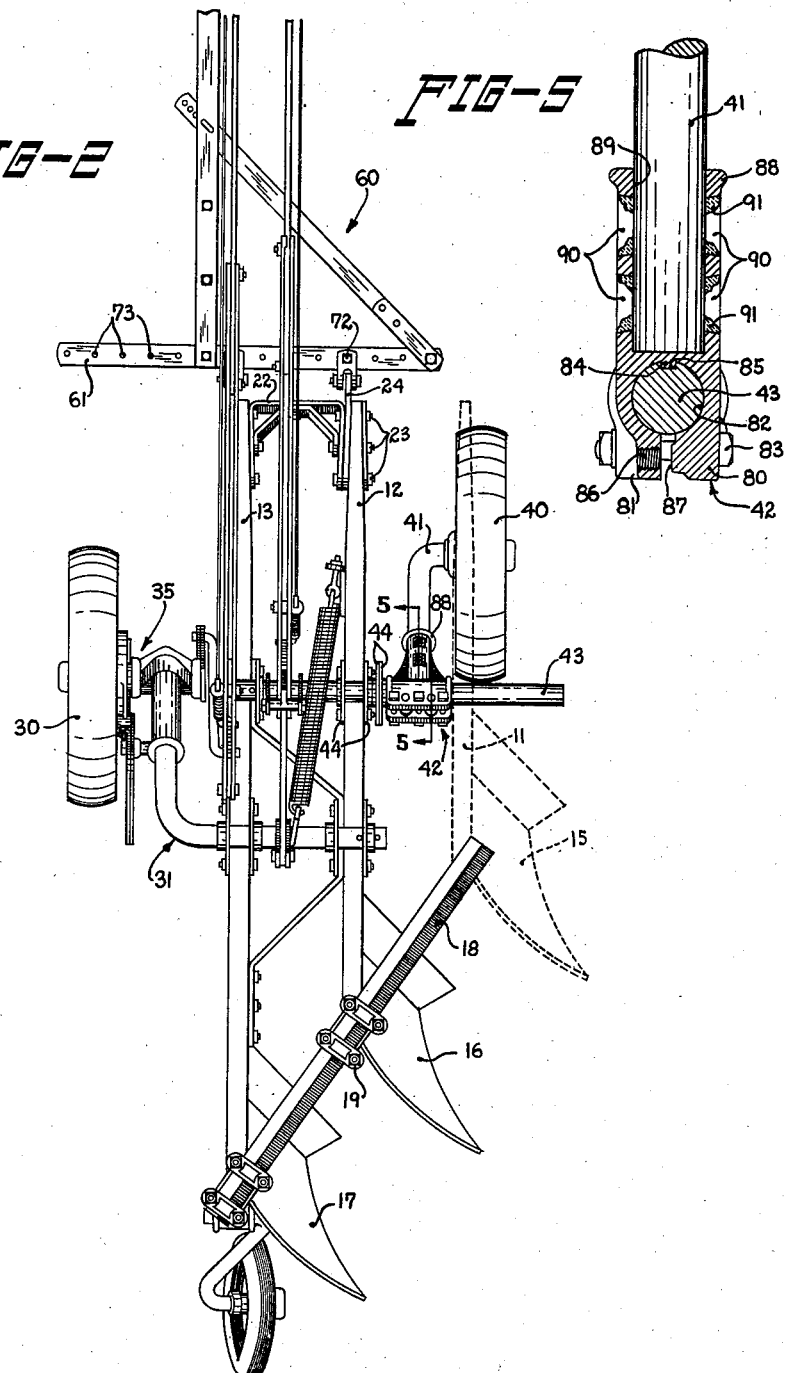

2,119,756

UNITED STATES PATENT OFFICE 2,119,756

PLOW

Carl G. Strandlund, Moline, Ill., assignor to Deere & Company, Moline, Ill., a corporation of Illinois Application January 27, 1937, Serial No. 122,582

3 Claims. (Cl. 97—100)

The present invention relates generally to plows and more particularly to a multi-bottomed plow, one of the bottoms of which can be removed when plowing under certain conditions.

On a great many farms, particularly those of larger sizes, there is considerable variation in the texture of the soil from one end of the farm to the other. For example, the soil in one field may be of a light sandy texture in which a plow can be operated with comparatively light draft while in another field the soil may be of a heavy sticky nature requiring a comparably heavy draft for the plow. Hence, a tractor of a given size might have sufficient power for plowing in the first mentioned field with a three-bottom plow, while in the second field it would have sufficient power for only a two-bottom plow.

Furthermore, it is well known that it requires more power to plow a field on which there is considerable growth or stubble than one which is comparatively clean. With the given tractor it is, therefore, desirable to use plows of different numbers of plow bottoms under different plowing conditions.

The principle object of the present invention is to provide a plow, the number of bottoms of which can be varied by adding or removing plowing units.

It is well known, however, that the furrow wheel of the plow for satisfactory operation, should run in the bottom of the furrow which was opened during the previous trip across the field; hence, regardless of the number of plow bottoms, the furrow wheel must be spaced laterally from the furrowward plow unit a definite distance which is substantially equal to the distance between the furrows. Consequently, when a plowing unit is removed, it is necessary to adjust the furrow wheel laterally inwardly to a like spacing from the next adjacent plowing unit. Accordingly, a further object of my invention relates to the provision of means for laterally adjusting the furrow wheel.

Another object has to do with provision for laterally adjusting the hitch members to accommodate a greater or fewer number of plowing units.

These and other objects will be made apparent after a consideration of the following description and explanation, reference being had to the drawings appended thereto, in which—

Figure 1 is a plan view of an embodiment of my invention showing a plow having three plowing units;

Figure 2 is a plan view of the same plow converted to a 2-unit plow;

Figure 3 is a side elevation of the 3-unit plow shown in Figure 1;

Figure 4 is a side elevation of the 2-unit plow shown in Figure 2; and

Figure 5 is a detail in section of the clamping device for the furrow wheel crank axle taken along a line 5—5 in Figure 2.

Referring now to the drawings and more particularly to Figures 1 and 3, the 3-unit or 3-bottomed plow indicated generally by the reference numeral 10, comprises 3 parallel longitudinally extending plow beams 11, 12 and 13, having downwardly curving rear end portions 14 to each of which is fixed a plow bottom 15, 16 and 17 respectively. The beams are secured together in laterally spaced arrangement by a heavy backbone member 18 of square cross section clamped to the rear end of each of the beams, respectively, in clamping members 19 supported on brackets 20, which are secured to the curved portions 14 of the respective beams.

The front end of the beams 11 and 12 are secured together by means of a generally U-shaped bracing member 21, while a second U-shaped bracing member 22 is rigidly fixed between the central beam 12 and the left-hand or landward beam 13. The bracing members 21, 22 are secured to the beams by means of bolts 23. A hitch plate 24 is also connected to the front end of each of the plow beams by the bolts 23. Thus, the three plow beams 11, 12 and 13 are secured together by the front and rear bracing members and by other intermediate members which will be referred to later, to form a unitary rigid structure.

The plow is supported on a land wheel 30 which is connected in a conventional manner to the plow structure by a crank axle 31, having a transversely extending supporting portion 32 rotatably mounted in a plurality of bearing plates 33, fixed on opposite sides of the central and left-hand plow beams 12, 13 respectively, by bolts 34. The portion 32 is held against axial movement by pins 37 inserted through holes on opposite sides of one of the bearing plates 33. By swinging the crank axle 31 in its bearing plates 33, the plow structure can be raised and lowered relative to the wheel for setting the plow in its transport and plowing positions respectively. Power for swinging the crank axle is obtained from the land wheel 30 during forward movement of the plow by means of clutch and linkage mechanism indicated generally by the reference numeral 35, and as it is well known to those skilled in the art, a detailed description is not necessary. A manually operated lifting lever 36 is connected by conventional linkage means for raising and lowering the plow by hand.

The plow is supported on its opposite side on a furrow wheel 40 which is journaled on a crank axle 41. The crank axle 41 terminates in a clamping device 42, which will be described more in detail later, by which it is slidably connected on a transversely disposed shaft 43, which is rotatably secured to the three plow beams by means of a plurality of bearing plates 44, which are bolted on opposite sides of each of the plow beams, 11, 12 and 13, and secured thereto by bolts 45. Since the furrow wheel crank axle 41 is tightly clamped on the rotatable shaft 43, the crank axle 41 swings in a vertical plane when the shaft is rotated in its bearing plates 44.

The shaft 43 is connected to the land wheel crank axle 31 by a longitudinally extending link 46 so that when the crank axle 31 is swung by means of the lifting lever 36 or the clutch mechanism 35, both crank axles 31 and 41 are swung to raise the plow into transport position or to lower it into plowing position. The shaft 43 can be rotated relative to the land wheel crank axle 31 by means of a second hand lever 47 for the purpose of adjusting the furrow wheel 40 vertically relative to the land wheel 30, when leveling the plow with respect to the ground. A lifting spring 48 is connected between the crank arm 49 fixed on the bearing portion 32 of the land wheel crank axle 31, to which is also connected the link 46, and extends forwardly to an anchorage comprising an eye bolt 50 fastened to a lug 51 which is attached to a central beam 12. Since this mechanism forms no part of the present invention and is well-known to those skilled in the art, a detailed description of this linkage need not be herein set forth. It is to be noted, however, that this mechanism, as well as the lifting spring 48, is disposed between the two landward beams 12, 13, leaving the space between the central beam 12 and the furrowward beam 11 free from all mechanism.

In order to assure additional strength and rigidity in the plow beam structure, a pair of braces 55, 56, are bolted on opposite sides of the central beam 12 by the bolts 34 which also secure the bearing plates 33 to the beam. These braces extend diagonally outwardly and forwardly and are bolted to the two outer beams 11, 13 by the bolts 45 which hold the bearing plates 44 to these outer beams. The left hand bracing member 55 also has a rearward extension 57 which extends diagonally rearwardly and landwardly and is bolted at its rear end to the landward plow beam 13 by bolts 58.

The plow is pulled through a draft member, indicated generally by the reference numeral 60, which comprises a transversely disposed hitch bar 61, a forwardly extending draft beam 62 and a diagonal bracing member 63 connected to one end of the hitch bar 61 by a bolt 64 and extending to a point of connection with the draft beam. As evident in Figure 3, the draft beam 62 comprises a pair of vertically spaced drawbars. The bracing member 63 lies between them and is fixed in place by a pin 65 which is inserted through aligned openings in the vertically spaced bars 62 and through one of a row of apertures 66 in the bracing member 63. After removing the pin 65, the draft beam 62 can be pivoted in a horizontal plane about a pivot bolt 67 by which it is attached to the transverse hitch bar 61, and then secured in angularly adjusted position by reinserting the pin 65 through one of the other holes 66 thus changing the angle of the beam 62 with the line of draft. The forward end of the beam 62 is connected to the tractor by any suitable means (not shown). Each of the plow beams is connected to the transverse hitch bar 61 by a clevis 70 which is pivotally connected to the hitch plate 24 by a horizontal bolt 71 and pivotally connected to the hitch bar 61 by a vertical bolt 72. A plurality of spaced holes 73 are provided in the hitch bar 61 for the purpose of laterally adjusting the hitch member 60 relative to the plow beams.

I will now explain the provision for converting the plow from a 3-bottom plow to a 2-bottom plow. The right hand or furrowward plow beam 11 is readily detached by removing the pivot bolt 72 which connects the clevis 70 with the hitch bar 61; then disconnecting the bracket 21 from the forward end of the central beam 12 after removing the nuts from the bolts 23. The bolts 45 which fasten the beam 11 to the bearing plates 44 are then removed and the diagonal brace 56 is disconnected from the central beam by temporarily removing the bolts 34. The bracket 19 of the beam 11 is then unbolted from the backbone member 18 after which the right hand or furrowward plowing unit can be lifted out of position, carrying with it the forward bracking member 21.

The furrow wheel 40 should now be adjusted inwardly to the proper spacing from the next adjacent plow beam 12 in the position shown in Figure 2. In this position the wheel and its associated crank axle 41 occupy in general the position vacated by the furrowward plow beam 11. In Figure 2 the latter plow unit is indicated by dotted lines to show the relative positions of this unit and the furrow wheel in its inwardly adjusted position. The method of laterally adjusting the furrow wheel will be better understood after the following description of the clamping member 42.

Referring now to Figure 5, the clamping member 42 is bifurcated and includes two opposing clamping portions 80, 81 which enclose a cylindrical aperture 82 adapted to receive the shaft 43. A plurality of bolts 83 are inserted through aligned bolt holes in the outer ends of the portions 80, 81. When the bolts 83 are tightened, the portions 80, 81 are drawn together to tightly embrace the transverse shaft 43. In order to prevent relative rotation between the shaft 43 and the clamping member 42, a key-like projection 84 is formed on the inner surface of the cylindrical opening 82 which is adapted to lie within a spline 85 in the shaft 43. This spline extends along the shaft 43 over the full length of the range of adjustment of the clamping member 42.

After the bolts 83 are moved, the clamping member 42 is slidable along the shaft 43. In order to facilitate this adjustment, provision is made for spreading the clamping member apart so that excess clearance between the portions 80, 81 is provided to accommodate any irregularities in the surface of the shaft 43. This provision comprises a pair of tapped holes 86 disposed in the outer lip of one of the portions 81 of the clamp 42. In alignment with each of these apertures is a boss 87 formed in the opposite clamping portion 80 by screwing one of the bolts 83 into each of the holes 86 until the end of the bolt bears against the boss 87. The clamping portions 80, 81 can be forced apart an amount necessary to provide free sliding of the clamp member 42 along the shaft 43.

The clamp member 42 includes a socket portion 88 disposed substantially at right angles to the axis of the shaft receiving opening 82. This socket portion 88 has a socket 89 adapted to receive the end of the crank axle 41. A number of apertures 90 are provided in the shank of the socket portion 88 and the crank axle 41 is rigidly fixed in the socket 89 by welding a fillet 91 in each of the holes 90 between the crank axle 41 and the socket portion 88.

It is to be noted that the bearing plates 44 for the detachable plow beam 11 need not be removed from the shaft 43 when the beam 11 is removed, as they are free to slide inwardly toward the next adjacent beam 12 when the furrow wheel is moved, as shown in Figure 2. Since the raising and leveling mechanism is disposed between the two landward beams 12, 13, it is not affected by the conversion of the plow nor does it interfere with the detaching and attaching of the furrowward plow unit. After the conversion of the plow from a 3-bottom to a 2-bottom plow, the draft member 60 must also be adjusted laterally in order to obtain the proper line of draft on the plow. This is accomplished by removing the vertical pivot bolts 72 from the two remaining clevises and moving the draft member 60 toward the land wheel 30 to a position such as indicated in Figure 2, after which the bolts 72 are reinserted through others of the openings 73.

The conversion of the plow from a 3-bottom to a 2-bottom plow is simply the converse of the operation heretofore described. The furrow wheel 40 is first adjusted toward the right to provide room for the plow beam 11 which is then reconnected into its former position, as shown in Figure 1.

What I claim as my invention and desire to protect by Letters Patent of the United States, is set forth in the following claims.

I claim:

1. In a convertible plow of the class described, the combination of a plurality of plow bottoms, a longitudinally extending plow beam connected to each of said bottoms, respectively, a common draft member, said plow beams being detachably connected to said common draft member in laterally spaced relation, a supporting wheel for the plow, and means for connecting said supporting wheel to said beams including means for adjusting said wheel laterally inwardly to occupy the space vacated by the adjacent plow beam when the latter is removed.

2. In a convertible plow of the class described, a plurality of parallel longitudinally extending plow beams, brace means for detachably interconnecting said beams to form a unitary structure, a common draft member, means for detachably connecting each of said plow beams to said draft member, a furrow wheel for said plow, a supporting bracket for said furrow wheel, a shaft mounted transversely on said beams, means for slidably connecting said bracket on said shaft, and means for selectively fixing said bracket to said shaft at a point spaced furrowward of the adjacent plow beam when all of said beams are in attached position, and at a second point spaced furrowward of the next adjacent plow beam when the first mentioned beam is detached from the plow, said wheel and supporting bracket in the latter position being disposed generally in the space vacated by said first mentioned beam.

3. A convertible plow of the class described having three longitudinally extending plow beams, each beam carrying a plow bottom, brace means for interconnecting said beams to form a unitary structure, the most furrowward of said beams being detachable from the other two beams for converting the plow from a three bottom plow to a two bottom plow, a land wheel for supporting said plow, a crank axle for said land wheel including a transverse supporting portion rotatably mounted in a bearing on each of said other two beams, respectively, a furrow wheel for supporting said plow, a crank axle for said furrow wheel, a shaft mounted transversely on said beams, means for slidably connecting said furrow wheel crank axle on said shaft, and means for selectively fixing said crank axle to said shaft at a point spaced furrowward of said furrowward beam when operating as a three bottom plow, and at a second point spaced furrowward of the next adjacent plow beam when operating as a two bottom plow, said furrow wheel and crank axle in the latter position occupying generally the space vacated by the detached plow beam.

CARL G. STRANDLUND.